United States Patent [19]

Anderson

[11] 4,241,610
[45] Dec. 30, 1980

[54] ULTRASONIC IMAGING SYSTEM UTILIZING DYNAMIC AND PSEUDO-DYNAMIC FOCUSING

[75] Inventor: Weston A. Anderson, Palo Alto, Calif.

[73] Assignee: Varian Associates, Inc., Palo Alto, Calif.

[21] Appl. No.: 9,721

[22] Filed: Feb. 5, 1979

[51] Int. Cl.³ ............................................. G01N 29/04
[52] U.S. Cl. ..................................................... 73/626
[58] Field of Search ......................... 73/626, 625, 628; 128/660

[56] References Cited

U.S. PATENT DOCUMENTS

| 4,005,382 | 1/1977 | Beaver | 73/626 |
| 4,058,003 | 11/1977 | Macovski | 73/626 |
| 4,161,121 | 7/1979 | Zitelli et al. | 73/626 |

Primary Examiner—Anthony V. Ciarlante
Attorney, Agent, or Firm—Stanley Z. Cole; Peter J. Sgarbossa

[57] ABSTRACT

A phased array ultrasonic imaging system is disclosed which combines aspects of both dynamic and pseudo-dynamic focusing. The system includes a linearly arranged array of side-by-side transducers adapted for propagating ultrasonic energy into a body to be ultrasonically examined and for receiving reradiated sonic energy from points within the body. A signal channel is connected to each of the transducers for activating same to propagate the sonic energy and for receiving electrical signals from the transducers (which correspond to the reradiated energy). Controllable delay means are provided in each of the channels for introducing linear phase shifts in the electrical signals proceeding in the channels during both transmission and reception to thereby azimuthally steer the transducer array. Means are further provided for processing the received signals proceeding through the channels and for combining same to effect a visual display of the bodily portion being examined. Means synchronized with the activating of the transmitters periodically reduce the gain of one or more symmetric outer transducer pairs of the array, thereby effecting reducing the aperture of the array to enable improved response to reflected acoustic information reaching the array from the near field thereof. The outer elements are similarly restored to enlarge the effective array aperture for improved response to reflected acoustic information arising from the far field of the array. Pursuant to the improvement of the invention, means are provided for adjusting the focal length of the array coincident with the aforementioned change in gain of the one or more outer transducer pairs, i.e., coincident with a change in effective aperture of the array in order to thereby maintain or achieve a desired resolution within a specified focal range.

16 Claims, 4 Drawing Figures

ULTRASONIC IMAGING SYSTEM UTILIZING DYNAMIC AND PSEUDO-DYNAMIC FOCUSING

BACKGROUND OF THE INVENTION

This invention relates generally to apparatus and methodology useful in effecting medical diagnosis, and more specifically relates to systems and methodology utilizing ultrasonic techniques for such purposes.

Over the course of the last several decades ultrasonic technology has played an ever-increasing role in medical diagnostics. Such techniques find application in diagnosis of various medical ailments wherein it is useful to examine internal bodily organs with the objective of locating features or aspects of such organs which may be indicative of disease, abnormalities or so forth.

While early systems of the foregoing type included but limited capabilities and display functions, there have more recently come into use highly sophisticated devices which are capable of providing real time or recorded displays with excellent detail and good resolution of desired portions of the body being considered.

In a typical such device the transducer utilized with the system comprises a phased array consisting of a plurality of transducer elements arranged in compact linear fashion. Each transducer element is individually connected to a suitable transmitter and receiver and the transmitted pulses are so phased as to steer the emitted sound beam in the desired direction. Adjustable delays provided in each receiver channel enhance the reception from the same direction as the transmitted sound beam. By suitably controlling the time of the voltages applied to the transducer elements and by controlling the adjustable delays of the separate receiver channels, the beam can be steered to any desired angle of a fan-shaped sector. Operation of the steered array is such that a plurality of radial lines defining the fan-shaped sector are successively generated with a relatively high number of such radial lines—typically of the order of 128 such lines—being utilized in the course of generating the entire sector. The set of such lines is generated over a short period, typically of the order of 1/30th of a second, whereby the corresponding display on the system cathode ray tube (CRT) is a high resolution substantially real time image of the bodily portion being examined. Said visualization is, in the terminology of the present art, a so-called B-mode display, i.e., one wherein variations of the acoustical impedance of the tissues are translated into brightness variations on the CRT screen.

Details regarding the prior art signal processing techniques utilized in apparatus of the foregoing type in order to generate the mentioned fan-shaped sector image are set forth in a number of points in the prior art. Reference may usefully be had, for example, to U.S. Pat. No. 4,005,382 to William Beaver entitled "Signal Processor for Ultrasonic Imaging," which patent is assigned to the assignee of the present application.

One of the serious problems that has plagued prior art systems of the foregoing type arises from poor resolution produced where the bodily portion being examined is present in the "near field" of the transducer. Conventional transducers and transducer arrays thus utilize the full active areas of the transducer faces in order to obtain maximum directivity and signal strength. While this procedure yields the desired results at distances larger than $D^2/4\lambda_1$ where D is the maximum linear dimension of the active transducer face and $\lambda$ is the wavelength of the largest spectral component in the medium propagating the signal; yet within this range the directivity of the received radiation pattern suffers, the pattern becomes very complicated, the angular resolution is degraded, artifacts generated become very complicated because single point echoes may give multiple presentations, and the range resolution suffers significantly because of the spread in time of arrival at various points on the transducer face of signals originating from any single point in the near field.

In the co-pending application of L. T. Zitelli et al., Ser. No. 817,394, filed July 20, 1977 now U.S. Pat. No. 4,161,121 issued July 17, 1979 for "Ultrasonic Imaging System," which application is assigned to the assignee of the instant application, a system is disclosed which obviates certain of the foregoing difficulties. In particular, the basic concept of such system is one of altering the linear dimensions of the transducer array during the reception of an echo train in such a way as to take advantage of a small transducer at close range and to increase the effective size of the transducer with range by switching receiving elements as a function of time. Thus, pursuant to the teaching of said Zitelli et al., which is sometimes referred to as "pseudo-dynamic focusing," the effective size of the transducer array (i.e., effectively the transducer array aperture) is made smaller when waves are transmitted to or received from objects in its near-field Fresnel region, and is made larger when waves are transmitted to or received from objects farther from the transducer in either the Fresnel region or in the far-field region of the larger transducer. In consequence, the effective beam size is made as small as possible for both regions.

Nextly, it may be noted that the process of "dynamic focusing" has been known for several years, having been reported in some detail (among other places) in an article by F. L. Thurston and O. T. VonRamm entitled "A New Ultrasonic Imaging Technique Employing Two-Dimensional Electronic Beam Steering," which article appeared at pages 249 ff of "Acoustical Holography," Vol. 5, ed. by Phillip S. Greene, Plenum Press, New York (1974). In the technique of dynamic focusing, the acoustic beam is not only steered by manipulation of relative time delays but further is in the received mode dynamically focused, in such manner that the electrically determined focal length of the array is swept outwards in synchronism with the increasing range of target echoes. This result is achieved by varying the relative time delays applied to the signals received by each transducer element in such a way that the effective focal length of the array corresponds with the instantaneous value of the range from which echoes are being received.

In many (if not most) systems utilizing dynamic focusing, the actual changes in focus are not effected in continuous fashion, which would involve an inordinately complicated and relatively expensive system. Rather, the change in focal length is carried out in stepped fashion. So long as one is interested in points which are relatively far from the transducer, i.e., in the far field thereof, the required changes in focus need not be effected too rapidly since the focal ranges (i.e., the region including the focal length wherein resolution is satisfactory) in the far field are relatively extended. As one moves, however, to the near field and into regions closer to the transducer, the focal ranges wherein adequate resolution is present, become of shorter and shorter axial extension, in consequence of which refocusing steps must occur closer and closer together. This in turn limits the usefulness of the dynamic focusing approach, by increasing the complexity and cost of applying such a system to apparatus of the type wherein it will be most useful.

In accordance with the foregoing, it may be regarded as an object of the present invention to provide an ultrasonic imaging system based upon use of a linear phased array transducer, wherein the advantageous aspects of dynamic focusing are achieved, yet without the complexity and cost which such a feature would otherwise require for its effective use at near field regions of the transducer array.

It is a further object of the present invention to provide an ultrasonic imaging system of the foregoing character wherein good and relatively constant resolution are achievable throughout the entire distance range of the instrument's operation, and yet by the use of relatively simple and inexpensive apparatus implementations.

SUMMARY OF THE INVENTION

Now in accordance with the foregoing invention, the foregoing objects and others as will become apparent in the course of the ensuing specification are achieved in a phased array ultrasonic imaging system which combines aspects of both dynamic and pseudo-dynamic focusing.

The system of the invention may therefore usefully be regarded as an improvement upon the pseudo-dynamically focused system set forth in the aforementioned Zitelli Ser. No. 817,394 application. The present system thus includes a linearly arranged array of side-by-side transducers adapted for propagating ultrasonic energy into a body to be ultrasonically examined, and for receiving reradiated sonic energy from points within the body.

A signal channel is connected to each of the transducers for activating same to propagate the sonic energy and for receiving electrical signals from the transducers which correspond to the reradiated energy. Controllable delay means are in each of the channels for introducing time delays in the electrical signals proceeding in the channels during both transmission and reception. Means control the delay means in the channels to thereby azimuthally steer the transducer array over a desired angular range. Means are further provided for processing the received signals proceeding through the channels and for combining same to effect a visual display of the bodily portion being examined. Means synchronized with the activating of the transmitters periodically reduce the gain of one or more symmetric outer transducer pairs of the array thereby effectively reducing the aperture of the array to enable improved response to reflected acoustic information reaching the array from the near-field thereof. The outer elements are similarly restored to enlarge the effective array aperture for improved response to reflected acoustic information arising from the far field of the array.

Pursuant to the improvement of the invention, means are provided for adjusting the focal length of the array coincident with the aforementioned change in gain of the one or more outer transducer pairs, i.e., coincident with a change in effective aperture of the array, in order to thereby maintain or achieve a desired resolution within a specified focal range. The focal range, FR is determined by the equation $FR = \lambda/\sin^2 u$, where $\lambda$ is the wavelength of the acoustic radiation reflected, and u is the half-angle subtended by the linear array at the axial coordinate Z corresponding to the midpoint of the focal range FR, where $\tan u = D/2Z$, where D is the linear dimension of the active portion (i.e., the effective aperture) of the said array.

The adjustment of the focal length is effected by the technique of further adjusting the delays in each of the said signal channels coincident with the change in gain of the outer element pairs, to thereby superimpose said change in focus on the linear phase shift producing azimuthal steering of the beam. Thus in a typical procedure of the invention, following firing of the transmitter, the return echoes from points near the transducer array will be processed with the array reduced in linear extension, i.e., by one or more pairs of symmetrically disposed outer transducer elements being reduced in gain or disabled altogether. During this initial step, delays of the several channels are adjusted to provide a focal length in the near field of a given range.

As the reflected echo data being considered moves outward to more distant points in the body, the effective aperture of the array, i.e., the length of same, is increased by activating the outer pairs of transducers; simultaneously with the stepped changes of this nature, the focal length of the array is changed as aforesaid.

In one embodiment of the invention, a relatively constant resolution may be maintained over the entire distance range of the system. Thus, the angle u as above defined, is maintained approximately constant, with the successively adjacent focal ranges (FR) being of the same length, and with the changes in focal length therefore occurring at equally spaced axial points. This type of arrangement is advantageous as representing an excellent and highly usable resolution result, while at the same time introducing relatively limited and acceptable numbers of changes in the foci position. The angle u as mentioned, is maintained constant in that as the focal length increases the effective aperture of the linear array is adjusted, to maintain the same value for tangent u.

BRIEF DESCRIPTION OF DRAWINGS

The invention is diagrammatically illustrated, by way of example, in the drawings appended hereto in which.

DESCRIPTION OF PREFERRED EMBODIMENTS

Figure 1:
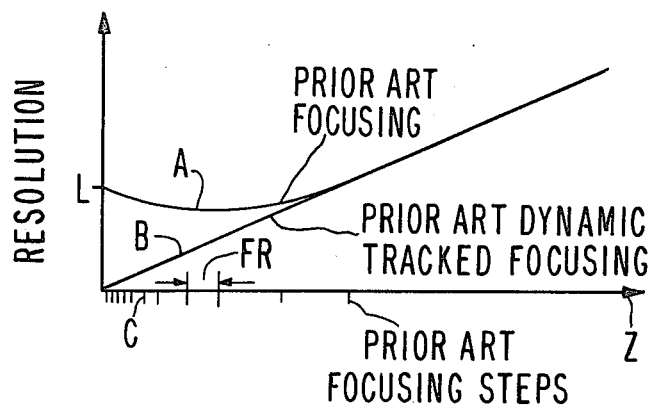
FIG. 1 is a graphical depiction of typical resolutions obtained in prior art systems based upon no focusing, and upon continuous and stepped tracked dynamic focusing.
Figure 2:
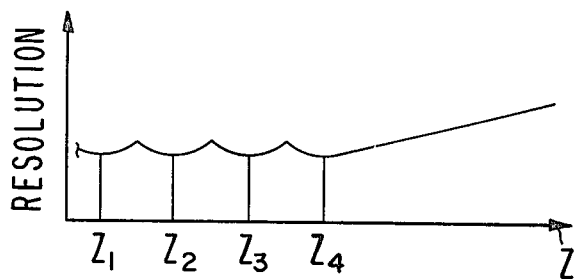
FIG. 2 is a graphical depiction similar to FIG. 1, but illustrating typical resolution achievable by one embodiment of the present invention.

In FIGS. 1 and 2 herein graphical depictions are set forth illustrating certain aspects of the prior art, and of the results achievable in accordance with the invention.

More specifically, in FIG. 1 representative graphs appear for resolution of typical prior art phased array ultrasonic imaging systems, as a function of location of a point object within the object space being examined by the transducer array. By "resolution," as used in this graph, is meant the separation which is required between a pair of points in the said object space, in order that the resultant image thereof might show adequately perceivable resolution.

The uppermost curve, curve A in FIG. 1, illustrates typical results achieved where no focusing is used. Resolution is seen to be variable in the near field, and to become quite poor as the object point approaches the transducer. The resolution rapidly deteriorates beyond a certain point as well. The ordinate L represents the linear length of the transducer aperture.

The curve B is indicative of results achieved with a prior art phased array system wherein fully-tracked dynamic focusing is utilized. The resolving qualities are seen to be excellent—including at close-in points to the transducer array. However, as previously discussed, a major difficulty with this type of system is its complexity and cost. As also mentioned, in point of fact almost all actual systems which utilize dynamic focusing achieve same not by utilizing continuous adjusting of the focal length but rather by making stepped adjustments—since in each instance any particular said focal length will have associated therewith a focal region of some length.

The vertical indicia marks identified by the reference character C thus represent the typical spacing that is required in dynamic focusing systems wherein focusing is thus effected in steps, i.e., each of these vertical lines C represents a point at which refocusing is required in order to approximate the curve B. That which is all too evident from these indicia marks C is that as one approaches closer and closer to the transducer, the refocusing must occur at ever-decreasing intervals. Thus, the aforementioned problem of cost and complexity invariably becomes an important factor if one desires to utilize stepped focusing, especially at close-in points to the transducer.

In FIG. 2 results achievable by practice of the present invention in a typical mode of operation are set forth. To be noted especially is that only a limited number of refocusings are required to yet achieve good resolution throughout a range of interest. In the embodiment of the invention, the results which are illustrated in FIG. 2, it will more specifically be seen that only four refocusings are effected. These are carried out at equal coordinate intervals, and the consequent resolution remains approximately constant for the system considered. It will be appreciated and should be emphasized here that the specific result shown in FIG. 2 is not the only one possible by practice of the present invention; however, the showing is illustrative and typical and well depicts one advantageous arrangement achievable by the invention. It should also be pointed out that the scales of FIGS. 1 and 2 are not identical. The relatively constant resolution achieved in FIG. 2 is of high quality—the function plotted would be much closer to the Z-axis if plotted on the scale of FIG. 1.

Figure 3:
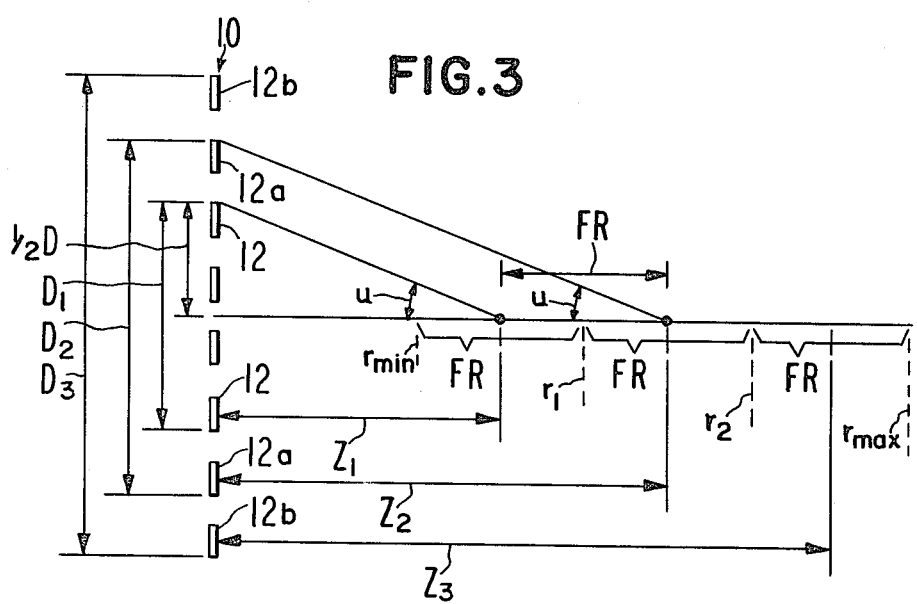
FIG. 3 schematically depicts a transducer array in relationship to certain points in its object field, and sets forth certain relationships useful in discussion of the present invention.

Referring next to FIG. 3, a schematic depiction appears of a transducer array 10 of the typical linear array type utilized in systems of the present type. Such array consists of a plurality of side-by-side piezoelectric elements 12, which are effectively arranged in a straight line. Pursuant to one aspect of the present invention, as will be further discussed in connection with FIG. 4, it is contemplated that the effective aperture D, i.e., the linear length of array 10, can be adjusted by electrically inactivating or reducing the gain of outer transducer pairs in symmetrical fashion. For example, three such effective apertures $D_1$, $D_2$ and $D_3$ are shown. For the $D_1$ aperture only the central four transducers are utilized. In the case of the $D_2$ aperture, an additional symmetrically disposed outer pair of further transducers have been activated, to now constitute the effective aperture $D_2$ for the enlarged array. For $D_3$ aperture an additional outer pair at symmetrically disposed transducers have been activated, to now constitute the effective aperture $D_3$ of the array.

At the object distance $Z_1$, it can be shown by well-known principles of optics that the corresponding focal range FR which causes differences in path lengths not to exceed the Rayleigh limit (and therefore provides acceptable resolution of the image plane) is given by: $FR = \pi/\sin^2 u$. Also it will be evident from the geometry of the Figure that the angle u is such that tangent $u = D/2Z$.

If we assume, to simplify the present discussion, that $r_{min}$ is the minimum range of interest for purposes of examining the body being considered by the present transducer and that $r_{max}$ is the maximum range of interest, then in the simplified showing of FIG. 3, satisfactory resolution of the type shown in FIG. 2 is achieved by setting the initial focal length to $Z_1$ and then by simply effecting focal length changes to refocus to $Z_2$ and $Z_3$, at the coordinates $r_1$ and $r_2$, (i.e., $r_1$ is the beginning of the focal range FR about $Z_2$, $r_2$ is the beginning of the focal range FR about $Z_3$, etc.) since the resolution will be fully adequate in all three of the adjacent segments labeled FR which cover the entire range $r_{min}$ to $r_{max}$ of examination.

To be noted in this analysis is that the angle u remains the same for the three refocusings, i.e., at $r_{min}$, $r_1$ and $r_2$, by virtue of the fact that the outer pairs of transducers 12a and 12b have been added to the array at the refocusing coordinates $r_1$ and $r_2$, respectively. It will, of course, be evident that illustration has been given in FIG. 3 for sequencing of three refocusing points where corresponding changes in their linear array are effected. In practice a number of such sequential changes can be made—thus, in FIG. 2 it is assumed that four such specific changes are made.

Figure 4:
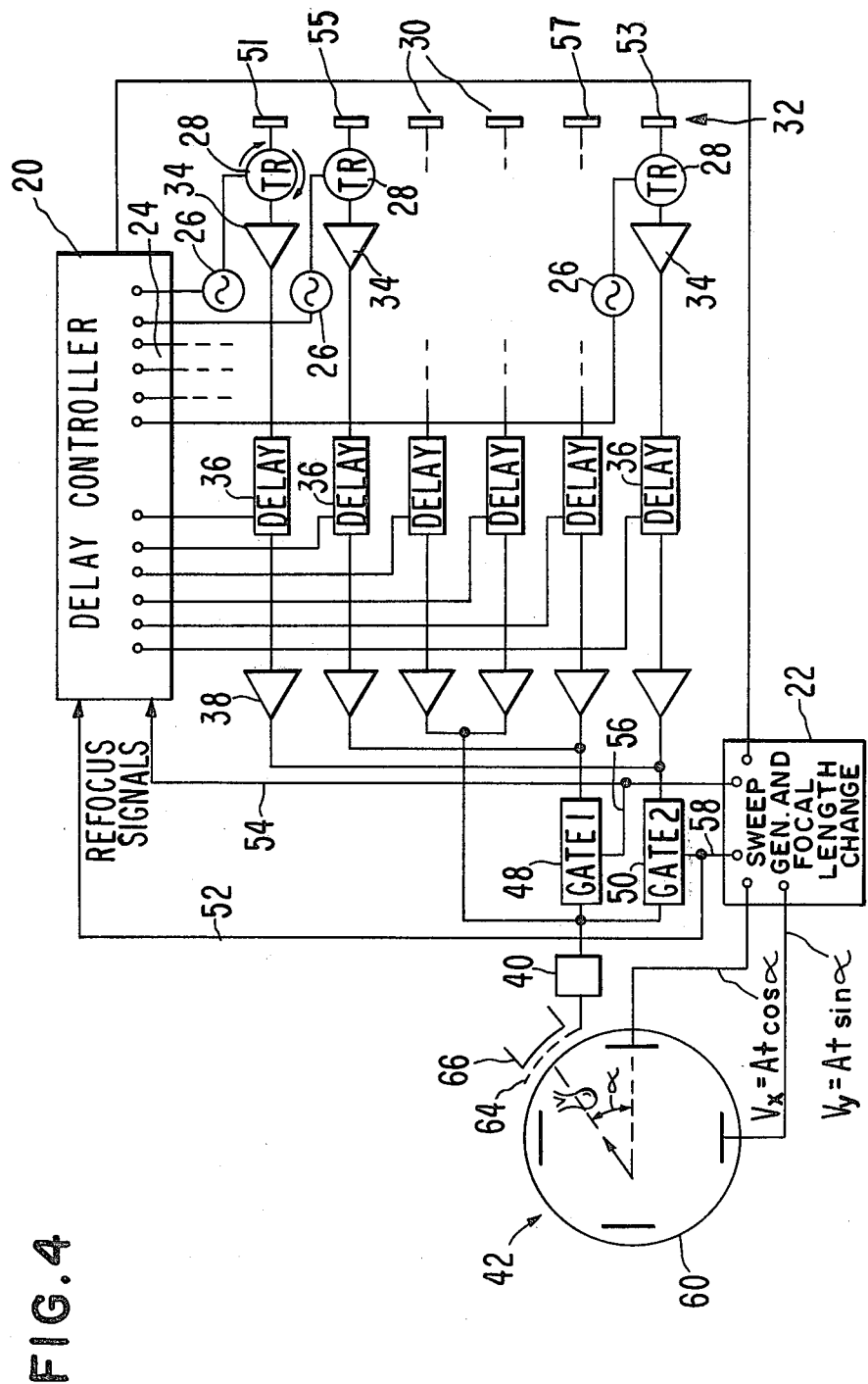
FIG. 4 is an electrical block diagram, schematic in nature illustrating an improved ultrasonic imaging system in accordance with the present invention.

FIG. 4 is a schematic block diagram of an apparatus embodiment of the invention. Delay controller 20 is synchronized with a sweep generator and focal length change means 22. Controller 20 generates transmitter trigger pulses on outputs 24 which sequentially fire transmitter pulsers 26. The oscillatory electrical pulses are conducted through transmit-receive (TR) switches 28 to piezoelectric elements 30 of transducer array 32. The angular displacement $\alpha$ of the acoustic beam wave is directed by the linear time delay between pulsed elements.

Received acoustic echoes are transduced to electric signals by elements 30. They are switched by TR switches 28 through pre-amplifiers 34, followed by delay lines 36. The individual delays of lines 36 are controlled by signals from controller 20, for steering and focusing purposes. The delayed signals go through buffer amplifiers 38 and are later combined, rectified by detector 40, and transmitted to the display device 42. The elements 30 at the center of array 32 and their corresponding delay circuits are connected directly to detector 40. Elements 51, 53, 55 and 57 near the outside of array 32 are connected to detector 40 in symmetric pairs, through gate circuits 48 and 50.

Controller 20 is synchronized to vary the respective time delays and resulting beam angles and focal ranges to sweep the beam over a desired angular range through a predetermined number of pulses. Sweep generator and focal length adjustment means 22 switch the gates 48 and 50 to regulate the effective beam size in the times following the transmitted pulse to optimize the beam size for each range of reflecting objects, i.e., this is to say that during the time that echoes are being processed from the near field, i.e., regions adjacent to transducer array 32, the gates 48 and 50 are inactive so that data from transducers 51, 53, 55 and 57 is not being processed, thus reducing the effective linear length of the array, i.e., the aperture of same. Sweep generator and focal length change means 22 also is seen to provide via lines 52 and 54, refocusing signals to delay controller 20. Such signals are generated at predetermined ranges by sweep generator and focal length change means 22.

Assuming, for example, that gates 48 and 50 are initially in an "off" position whereby the array 32 may be focused for the closest axial point, such as $Z_1$ in FIG. 3, the same signals which turn on gates 48 and 50, i.e., in lines 56 and 58, (to activate first the transducer pair 55, 57 and later the pair 51, 53) also may serve to readjust the focal length. More specifically, the resultant refocusing signals in lines 52 and 54 are interpreted by delay controller 20, which then readjusts the relative values of the various delays 36 to effect refocusing to the point $Z_2$ (FIG. 2) at the time pair 55, 57 are added; and then to point $Z_3$ at the time pair 51, 53 are added.

Means 22 also provides a beam deflection sweep for the display cathode ray tube 60. During the echo-receiving time for each pulse, the beam is deflected from an origin at an angle $\alpha$ corresponding to the angle of the acoustic wave for that pulse, in response to angle information received by sweep generator means 22 from delay controller 20. This angular cathode ray sweep is generated by coordinated control voltages on the orthogonal deflection elements of the CRT. The vertical deflection receives a signal $V = At \sin \alpha$ and the horizontal deflection receives a signal $V = At \cos \alpha$ where t is the time from start of the sweep, and A is a scaling constant. In this way the cathode ray beam is displaced at any instant to a point which is the two-dimensional image point of a corresponding point of reflection of the acoustic beam.

The combined received signals are applied to the control grid 64 of cathode ray tube 60. Control grid 64 modulates the beam current drawn from cathode 66 in response to the amplitude of the received signals. The brightness of the CRT face is thus a two-dimensional map of the acoustic reflections from objects in the fan-shaped sector scanned by the beam.

While the present invention has been particularly set forth in terms of specific embodiments thereof, it will be understood in view of the present disclosure that numerous variations upon the invention are now enabled to those skilled in the art, which variations yet reside within the scope of the present teaching. Accordingly, the invention is to be broadly construed and limited only by the scope and spirit of the claims now appended hereto.

I claim:

1. In a phased array ultrasonic imaging system of the type comprising:

a linear array of side-by-side transducers adapted for propagating ultrasonic energy into a body to be ultrasonically examined and for receiving reradiated sonic energy from points within said body;

a signal channel connected to each of said transducers, for activating said transducers to propagate said sonic energy, and for receiving electrical signals from said transducers corresponding to said reradiated energy;

delay means in each of said channels for introducing time delays in the electrical signals proceeding in said channels during said transmission and reception;

means controlling said delay means in each of said channels thereby to steer the acoustic beam from said transducer array over a desired azimuthal range to enable scanning of said body;

means for processing the received signals proceeding through said channels, and for combining said signals and effecting a visual display of the bodily portion being examined; and means synchronized with the activation of said transmitters for periodically reducing the gain of one or more symmetrically disposed outer pairs of elements of said array, to thereby reduce the effective aperture of said array for improved response to reflected acoustic information near said array and for restoring the gain of said transducer pairs, thereby increasing the said effective aperture of said array for improved response to reflected acoustic information reaching said array from the far field of the object being examined;

the improvement comprising:

means for adjusting the focal length of said array coincidental with the said changes of gain of said pair of elements of said array whereby to maintain a desired resolution within a desired focal range.

2. A system in accordance with claim 1 wherein said adjustmemt of said focal length is effected by further adjusting the delays in each of said channels coincident with said change in gain of said pair of elements, to thereby superimpose the resultant change in focus on the said phase shift producing azimuthal steering of said acoustic beam.

3. A system in accordance with claim 1, wherein said means adjusting said focal length effects a plurality of said adjustments in accordance with a plurality of changes in said effective aperture of said array over the operating distance range of said system.

4. A system in accordance with claim 3, wherein the successive focal ranges encompassing the points of refocusing, are of constant length and of substantially constant resolution.

5. A system in accordance with claim 3 in which said means adjusting the focal length effects different adjustments in accordance with the number of symmetrically disposed outer pairs which are activated.

6. A system in accordance with claim 1 in which said means for reducing the gain periodically fully disables said one or more symmetrically disposed outer pairs of elements to effect said reduction of the effective aperture of said array.

7. A phased array acoustic beam scanning system comprising:

a linear array of side by side transducer elements for transmitting an acoustic beam into a region of interest, and receiving acoustic energy reflected from points within said region;

first means for applying repetitive electric pulses to said elements to form said acoustic beam, and to receive from said elements electrical signals corresponding to said reflected acoustic energy, said means including delay circuit means for introducing time delays between said electrical pulses during transmission, and between said electrical signals during reception, said beam thereby being steered over a desired angular range in a plane transverse to said transducers;

second means synchronized with the application of said pulses to said elements for reducing the gain of at least a symmetric outer pair of elements of said array to reduce the extent of the active elements of said array during the time period in which near field reflected acoustic information arrive at said array; and third means synchronized with said second means for further adjusting said time delays applied to said electrical signals during reception of said reflected energy to effect changes in the focusing of said reflected energy in accordance with the changes in the active elements of said array introduced by said second means, whereby improved performance may be maintained over an extended focal range.

8. A scanning system as in claim 7, which further includes display means receiving said electrical signals as delayed by said first and third means, and corresponding to said reflected acoustic information, for supplying a visual representation of said region.

9. A system as in claim 7 in which said second means fully disables said one or more symmetrically disposed outer pairs of elements to effect said reduction in active elements.

10. In a phased array ultrasonic imaging system including a linear array of side by side transducer elements for transmitting an acoustic beam into a region of interest, and receiving acoustic energy reflected from points within said region, first means for applying repetitive electric pulses to said elements to form said acoustic beam, and to receive from said elements electrical signals corresponding to said reflected acoustic energy, said means including delay circuit means for introducing time delays between said electrical pulses during transmission, and between said electrical signals during reception, said beam thereby being steered over a desired angular range in a plane transverse to said transducers, second means synchronized with the application of said pulses for repeatedly further adjusting said time delays applied to said electrical signals during reception of said reflected acoustic energy to effect changes in the focal length of said array, and display means for supplying from said electrical signals from reflected energy a visual representation of said region, the improvement which comprises:

third means for reducing the gain of at least one outer element of said array during the arrival of near-field reflected acoustic information, and for restoring said gain thereafter to thereby effect changes in the effective aperture of said array, and for controlling said changes in focal length in accordance with said changes in said effective array aperture, whereby resolution of said visual representation is improved over an extended focal range.

11. An imaging system as in claim 10, in which said second means effects said changes in focusing in discrete steps, the occurence of said steps varying under the control of said third means at least in part with said changes in effective aperture of said array.

12. An imaging system as in claim 10, in which said third means reduces the gain of at least one symmetric outer pair of elements of said array.

13. An imaging system as in claim 10, in which said third means reduces the gain of a succession of outer symmetric pairs of elements, and controls said second means to superimpose time delays on said electrical signals in synchromism with said successive changes of outer element pair gain.

14. An imaging system as in claim 13 in which said reduction of gain of said successive outer symmetric element pairs provides successively smaller effective array apertures, each said aperture having an optimal near-field focal range associated therewith, each said aperture being successively utilized for information arriving from the respective near-field focal range associated therewith, said second means refocusing by readjusting with each such successive aperture change said time delays of said received electrical signals to accord with said focal range associated therewith.

15. An imaging system as in claim 14, in which said second means readjusts said time delays for said electrical signals to provide with each successive aperture change a focal length approximating the midpoint of the focal range associated with each said aperture.

16. An imaging system as in claim 14 or 15, in which said focal ranges associated with each of said apertures are approximately equal.

* * * * *